US006751898B2

(12) United States Patent
Heropoulos et al.

(10) Patent No.: US 6,751,898 B2
(45) Date of Patent: Jun. 22, 2004

(54) ELECTROLUMINESCENT DISPLAY APPARATUS

(76) Inventors: George W. Heropoulos, 229 Manley Ct., San Jose, CA (US) 95139; Tamas L. Torma, 500 Beach Park Blvd., Venice, FL (US) 34285

(*) Notice: Subject to any disclaimer, the term of this patent is extended or adjusted under 35 U.S.C. 154(b) by 133 days.

(21) Appl. No.: 09/782,992

(22) Filed: Feb. 13, 2001

(65) Prior Publication Data

US 2001/0018809 A1 Sep. 6, 2001

Related U.S. Application Data

(63) Continuation-in-part of application No. 08/685,238, filed on Jul. 23, 1996, now Pat. No. 6,205,690.

(51) Int. Cl.⁷ ............................................. G09F 13/22
(52) U.S. Cl. .................................... 40/544; 345/36
(58) Field of Search ........................ 345/36, 45, 99; 40/544, 442

(56) References Cited

U.S. PATENT DOCUMENTS 5,572,817 A * 11/1996 Chien .......................... 40/544
6,424,088 B1 * 7/2002 Murasko ...................... 313/506
2001/0042329 A1 * 11/2001 Murasko et al. .............. 40/544

* cited by examiner

Primary Examiner—Cassandra H. Davis
(74) Attorney, Agent, or Firm—Burns, Doane, Swecker & Mathis LLP

(57) ABSTRACT

An integrated electroluminescent display device includes: at least one illumination assembly formed by a first set of layers, the illumination assembly including a first electrode, a second electrode, a layer of electroluminescent material disposed between the first and second electrodes, and a plurality of conductive leads connected to corresponding ones of the first and second electrodes, the first electrode being translucent; a printed circuit layer having a plurality of conductive segments connected to corresponding ones of the first and second electrodes via the conductive leads; and an electronic component layer including electronic components having electrical contacts connected to corresponding ones of the segments of the printed circuit layer, the electronic components providing for selective illumination of the illumination assembly, the printed circuit layer is disposed in a substantially parallel and contiguous relationship with the first set of layers.

17 Claims, 10 Drawing Sheets

ELECTROLUMINESCENT DISPLAY APPARATUS

CROSS REFERENCE TO RELATED APPLICATIONS

This application is a continuation-in-part of co-pending, commonly-assigned U.S. patent application Ser. No. 08/685,238, filed on Jul. 23, 1996, U.S. Pat. No. 6,205,690 entitled "Panels with Animation and Sound" which is incorporated herein by reference. This application references PCT patent application, Ser. No. PCT/US97/12814 filed on Jul. 23, 1997, entitled "Electroluminescent Display Apparatus" which is incorporated herein by reference.

FIELD OF THE INVENTION

The present invention pertains generally to the field of electronic displays. Specifically, the present invention pertains to a compact and light weight electroluminescent display apparatus ideally suited for educational and entertainment presentations and advertising displays.

BACKGROUND OF THE INVENTION

Electroluminescent (EL) devices are commonly used to provide illumination in a variety of products including display panels, board games, watch faces, and keyboards. EL devices typically include a layer of phosphor disposed between two electrodes, at least one of the electrodes being light-transmissive. Because a dielectric is usually disposed between the electrodes, the EL device functions essentially as a capacitor. When a voltage of alternating current is applied across the electrodes, the phosphor material is activated and emits light.

EL devices may be manufactured as discrete cells or as large panels or rolls, and may be formed on rigid or flexible substrates. Each component of the device may be formed as a separate layer, such as a foil sheet serving as an electrode, and a planar dielectric sheet, with the layers being laminated together via a heat and pressure process. Alternatively, the layers may be combined into overlapping coatings printed on a substrate, as is the case for a layer of light-transmissive conductive ink serving as a top electrode followed by a layer of phosphor ink in a dielectric matrix and then another conductive ink coating serving as a back electrode. EL devices have found widespread uses, e.g. in signs, watch faces, and as back lighting for keyboards.

Membrane switches are generally constructed of two spaced-apart electrically conductive surfaces on separate substrates. At least one substrate is flexible. For example, each conductive surface may be a pattern of electrically conductive ink. A spacer layer with an aperture is positioned between the two facing conductive surfaces. When a user depresses the flexible substrate containing one of the conductive surfaces, the two conductive surfaces come into contact thereby causing activation of the switch and closing a circuit. Membrane switches have also been used in a variety of devices, such as on keyboards and control panels for appliances. See, e.g., U.S. Pat. No. 4,683,360 to Maser for a membrane switch combined with an EL lamp panel.

U.S. Pat. No. 4,683,360 to Maser discloses a combined electroluminescent panel activated by a flexible membrane switch. The flexible membrane switch is generally constructed of two spaced-apart electrically conductive surfaces on separate substrates. At least one substrate is flexible. For example, each conductive surface may be a pattern of electrically conductive ink. A spacer layer with an aperture is positioned between the two facing conductive surfaces. When a user depresses the flexible substrate containing one of the conductive surfaces, the two conductive surfaces come into contact, thereby causing activation of the switch and closing a circuit.

U.S. Pat. No. 4,532,395 to Zukowski discloses a combination flexible membrane switch panel disposed adjacent to flexible EL material. The flexible membrane switch includes two spaced-apart electrically conductive surfaces on separate substrates with a spacer layer, having an aperture positioned therebetween. One of the conductive surface is flexible, with another flexible layer, having translucent indicia, positioned adjacent to and spaced apart therefrom. Disposed between the translucent indicia and the flexible membrane is a flexible layer of EL material. In this manner, both the indicia layer and the EL material may be depressed to allow operation of the flexible membrane switch.

Many interactive games and learning devices include flexible membrane switches to allow a user to control some elements of the stimuli these devices produce. In this fashion, the games and learning devices are more likely to hold the attention of a user for a longer period of time when compared to passive devices.

U.S. Pat. No. 5,087,043 to Billings et al. discloses an interactive audio-visual puzzle that includes, in pertinent part, a rigid puzzle form defining a predetermined number of form cutouts, an upper graphic disposed on the form upper surface and a plurality of respective removable puzzle pieces. Each of the puzzle pieces includes a peripheral configuration conforming to that of an associated form cutout and bears a piece graphic. A flexible membrane bears on the underside thereof, along with a plurality of conductors in a predetermined relative disposition. A plurality of respective lower graphics overlie the flexible membrane and underlie the form cutouts. A sound generator produces respective predetermined associated sounds in response to the input signals applied thereto. The flexible membrane conductors, space and ground plane cooperate to form a touch-pad which corresponds to each of the lower graphics electrically connected to the sound generator. In this manner, the sound generator is selectively actuated to produce sounds in response to input signals. A drawback with Billings et al. is that no animation is provided which would provide the puzzle with more appeal to a user.

U.S. Pat. No. 4,703,573 to Montgomery et al. discloses a visual audible activated work that includes, in pertinent part, at least two pages pivotally attached to each other so that the pages are pivotal from a juxtaposed closed position to an adjacent opened position. A liquid crystal display (LCD) is affixed to one of the pages. A sound generator is attached to the LCD, and a power supply is coupled to automatically provide power to both the sound generator and the LCD when the pages are paced in the opened position. A drawback with Montgomery et al. is that the LCD display limits the number and variety of interactive devices that may be present on any given page.

A variety of billboard and signboard systems are available for indoor and outdoor advertising. U.S. Pat. No. 5,123,192 to Hsieh discloses a display system that includes a liquid crystal display plate. The display plate is typically positioned indoors between a product to be advertised and a store-front window. The display pate is visible from the outside, and is adapted to alternatingly become transparent and translucent. In this fashion, the display plate periodically forms images which may associated with the product and allows viewing of the product through the windows, without any images being present.

U.S. Pat. No. 4,739,567 to Cardin discloses a display system for a store-front window that includes a retractable projection screen, a slide projector and a mirror. The projection screen is disposed proximate to the window, with the mirror disposed opposite to the window. The slide projector is positioned to direct an image away from the window onto the mirror. The mirror is orientated to project the optical image information onto the screen. A timer is employed to allow the screen to be periodically retracted. Typically, the timer means retracts the screen during the daylight hours so that the store-front window may be used as a simple display window. During the evening hours, the projector screen is lowered so that images may be viewed thereon. A second timer means is employed to sequence the slide projector through the queue of slides contained therein. A drawback with the two aforementioned systems is that they are relatively complicated, requiring precise orientation of the various components of the system, thereby precluding portability.

Many portable viewing screens are available in the prior art. U.S. Pat. No. 4,169,658 to Brown and U.S. Pat. No. 4,110,003 to Zinn each discloses a portable projection screen that includes a flexible viewing surface. The flexible viewing surface is typically stored in a portable housing and may be extended therefrom to facilitate viewing optical information generated from, for example, movie or slide projectors. A drawback with these devices is that the operation of the screens depends upon the availability of a projection system. In addition, as discussed above in regard to U.S. Pat. No. 4,169,658, there is difficulty in comprehending the optical information viewed, outdoors, on a projection screen during daylight hours.

Another type of EL device includes a layer of phosphor disposed between two electrodes, at least one of which is light-transmissive. U.S. Pat. No. to Veltri et al. disclose such a display which includes an EL strip adapted to function as a belt to form to the body of a wearer. The low power requirements of the belt allow the EL material to be powered by a battery. The EL material allows the wearer to be seen at night and during low-light conditions, for example, during dusk. While highly portable, the belt does not afford a sufficient amount of surface area to function effectively as a display for advertisements.

It is an important object of the present invention to provide a compact and light weight EL display apparatus. More specifically, it an important object of the present invention to provide an EL display apparatus including illumination layers forming a plurality of EL illumination assemblies, and circuit layers including electronic components providing for selective illumination of the illumination assemblies, wherein the illumination layers and circuit layers are contained in a flat envelope.

Another object of the present invention is to provide an interactive page or panel device for generating audio visual stimuli wherein the visual stimuli provides an illusion of movement.

Another object of the present invention is to provide an increased number of interactive devices per unit area than interactive devices of the prior art.

A further object of the present invention is to provide an audio visual system which is easily adaptable to existing interactive devices.

Yet another object of the present invention is to provide a portable display device that has sufficient surface area to capture the attention of listeners and viewers and have them perceive a message contained thereon in various lighting conditions.

SUMMARY OF THE INVENTION

In one embodiment of the present invention, the above objects have been achieved with an interactive book including a series of individual display pages. Each page includes a character-bearing, printable layer overlying a spatially-arranged display pattern of electroluminescent (EL) lamps with at least one EL lamp positioned directly underneath each character that has been selected for illumination. Each page also includes a membrane switch having an imprinted activation region which, when depressed by the user, closes the circuit for at least one EL lamp on the page and thereby causes activation of the lamp and illumination of the overlying character. By printing with various inks and on various surfaces, the EL lamps can be used to make characters appear and disappear, as well as change color.

A sequencing circuit is operably connected to the electrical circuitry of at least some of the EL lamps on a page. The sequencing circuit is triggered by the touch of a membrane switch, as with the circuitry for the simple illumination of lamps. The sequencer is set for a specific pulse rate and order, causing timed and ordered activation of the EL lamp series. Precise timing and ordering of the sequenced series in combination with careful placement of printed characters on the display page provides motion effects, such as animation, of the characters.

In a second embodiment, a substrate including a tier of EL material forms a pattern which corresponds to a series of images that provide an illusion of movement when illuminated in accord with a predetermined sequence. A sound generator is used to produce predetermined audible tones or words linked in meaning to the images. A flexible membrane switch is coupled to simultaneously activate both the EL material and the sound generator when depressed by a user. A layer includes a plurality of icons, with each of the plurality of icons being associated with one of a first and second set of illustrations. The first set of illustrations is adapted to be viewable with an unaided eye on a continuous basis, and the second set of illustrations comprises the pattern of the EL material and are selectively viewable with the unaided eye, when the EL material illuminates. The sound produced by the generator may or may not be a succession of audible responses corresponding to the predetermined sequence. Each audible response of the succession may or may not be uniquely associated with one of the illustrations of the second set.

In a third embodiment, an integrated EL display device includes: at least one illumination assembly formed by a first set of layers, the illumination assembly including a first electrode, a second electrode, a layer of EL material disposed between the first and second electrodes, and a plurality of conductive leads connected to corresponding ones of the first and second electrodes, the first electrode being translucent; a printed circuit layer having a plurality of conductive segments connected to corresponding ones of the first and second electrodes via the conductive leads; and an electronic component layer including electronic components having electrical contacts connected to corresponding ones of the segments of the printed circuit layer, the electronic components providing for selective illumination of the illumination assembly, the printed circuit layer is disposed in a substantially parallel and contiguous relationship with the first set of layers.

DETAILED DESCRIPTION OF THE PREFERRED EMBODIMENTS

Figure 3:
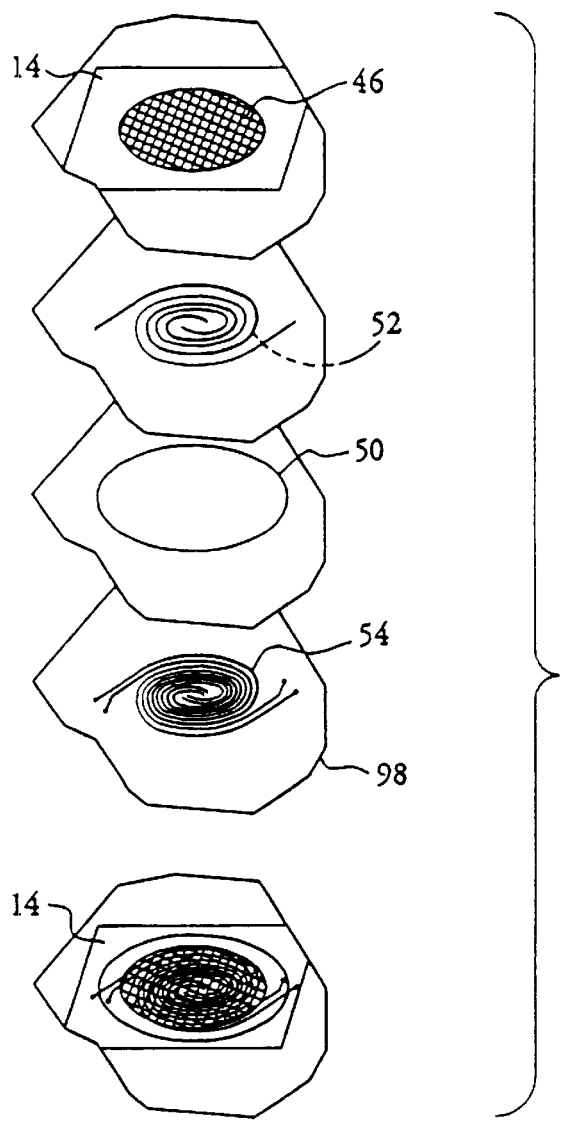
Figure 6:
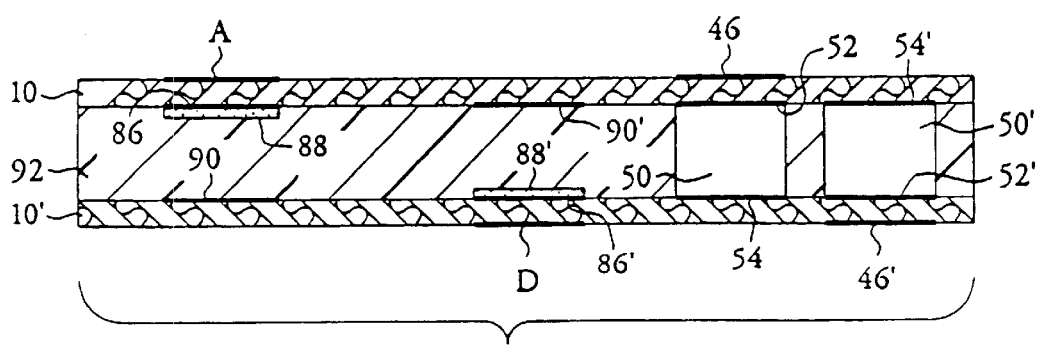
Figure 4:
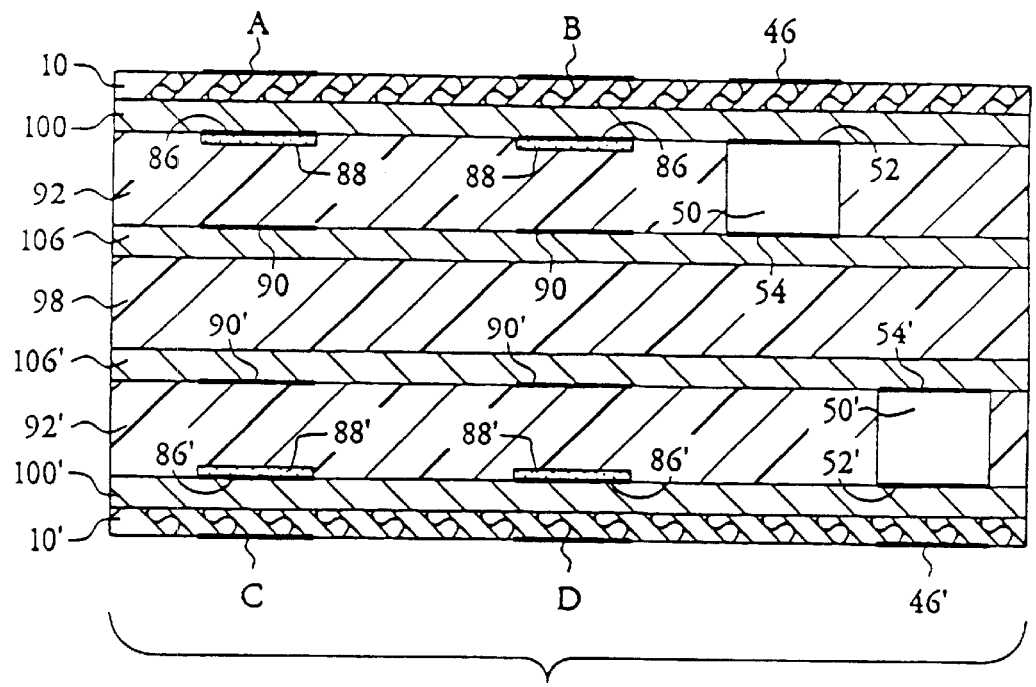
Figure 5:
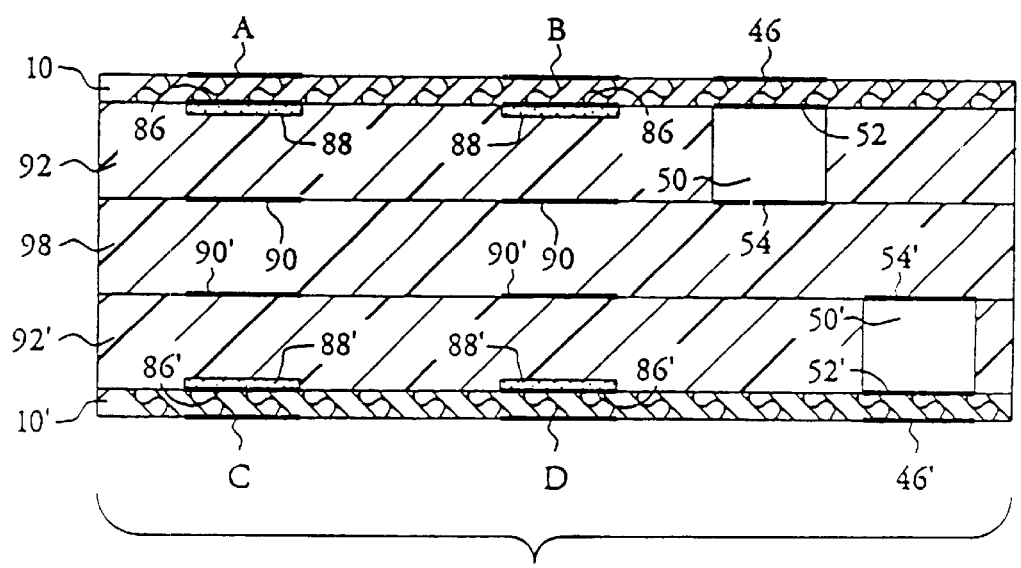
Figure 7:
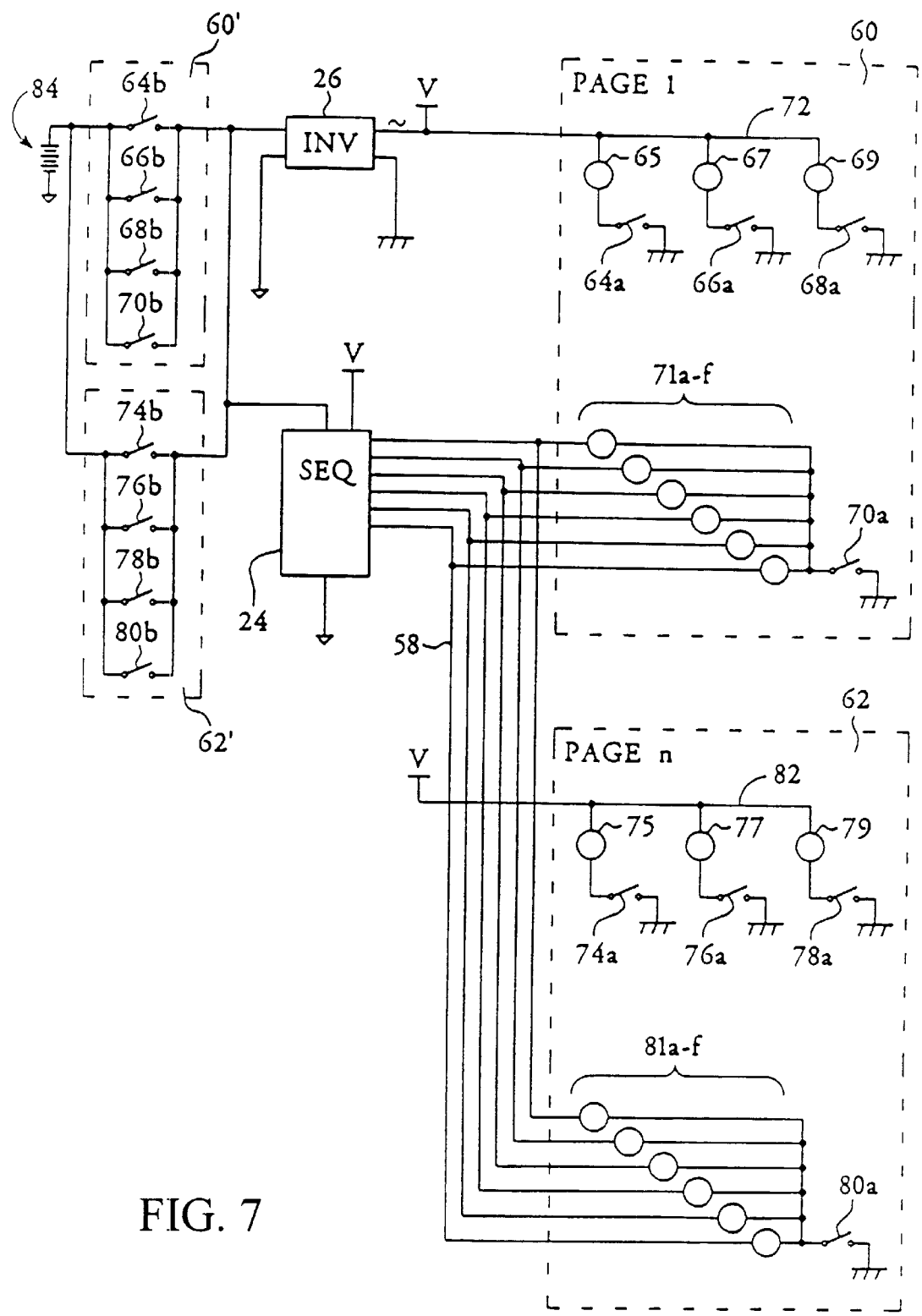
Figure 8:
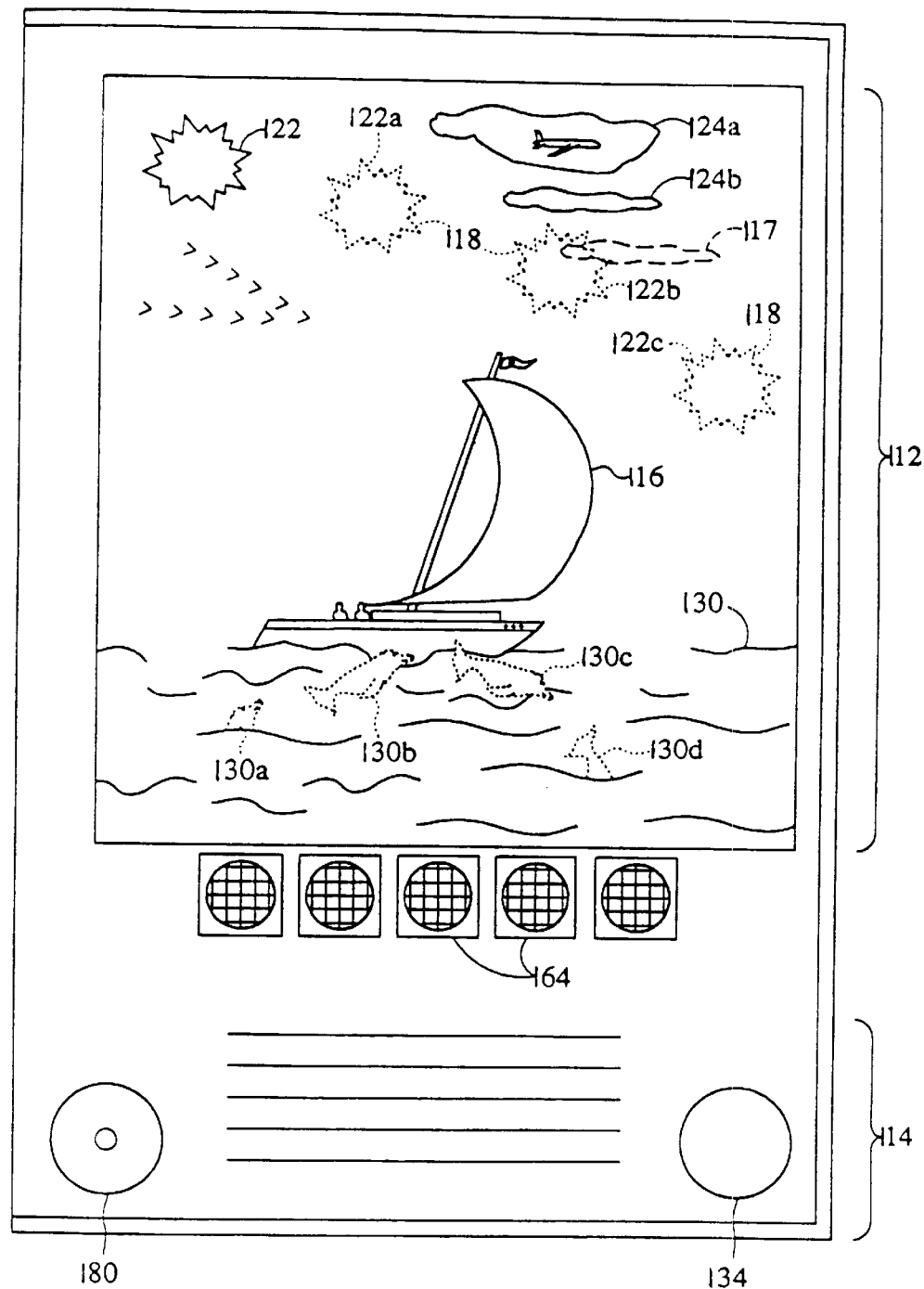
Figure 9:
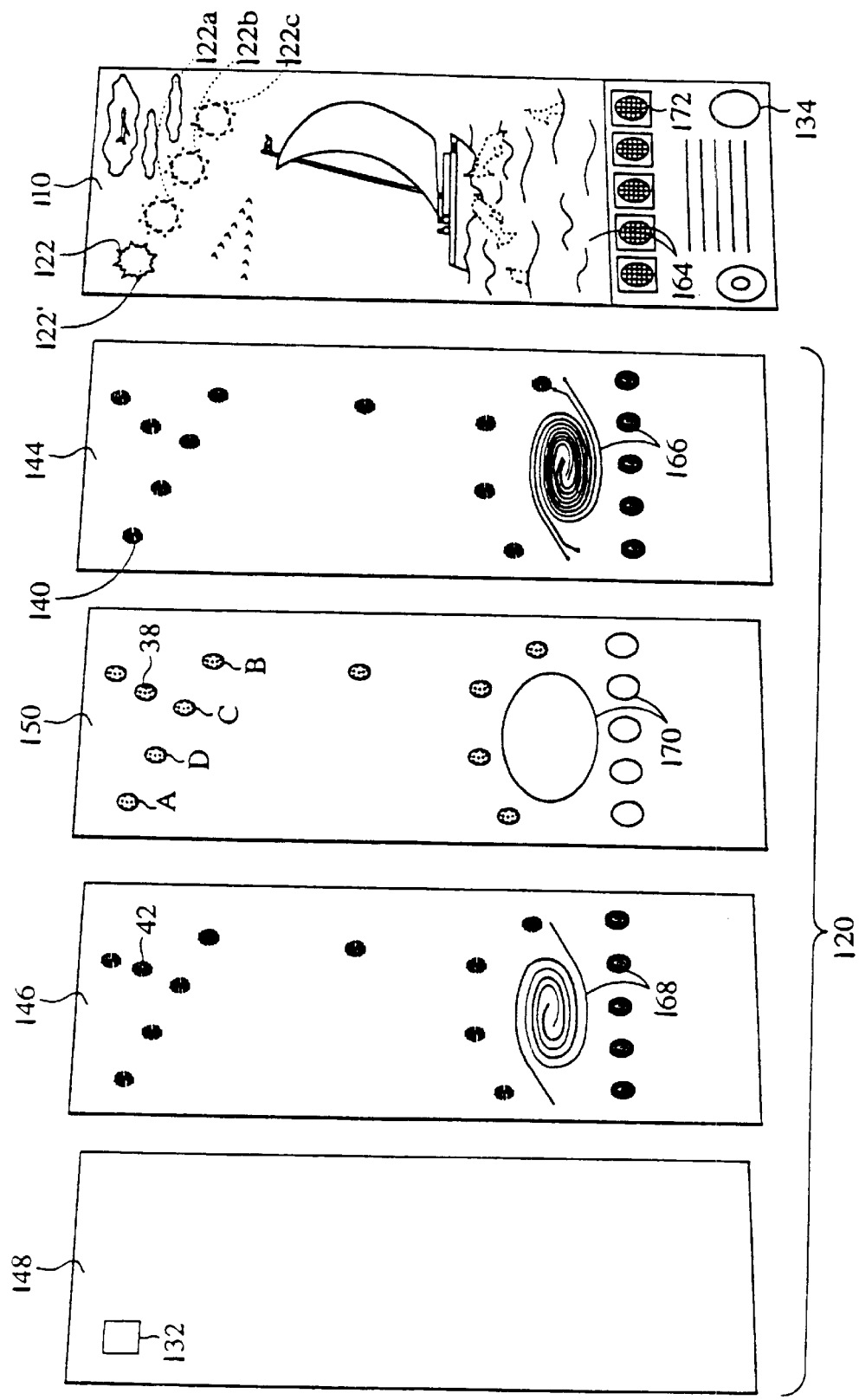
Figure 10:
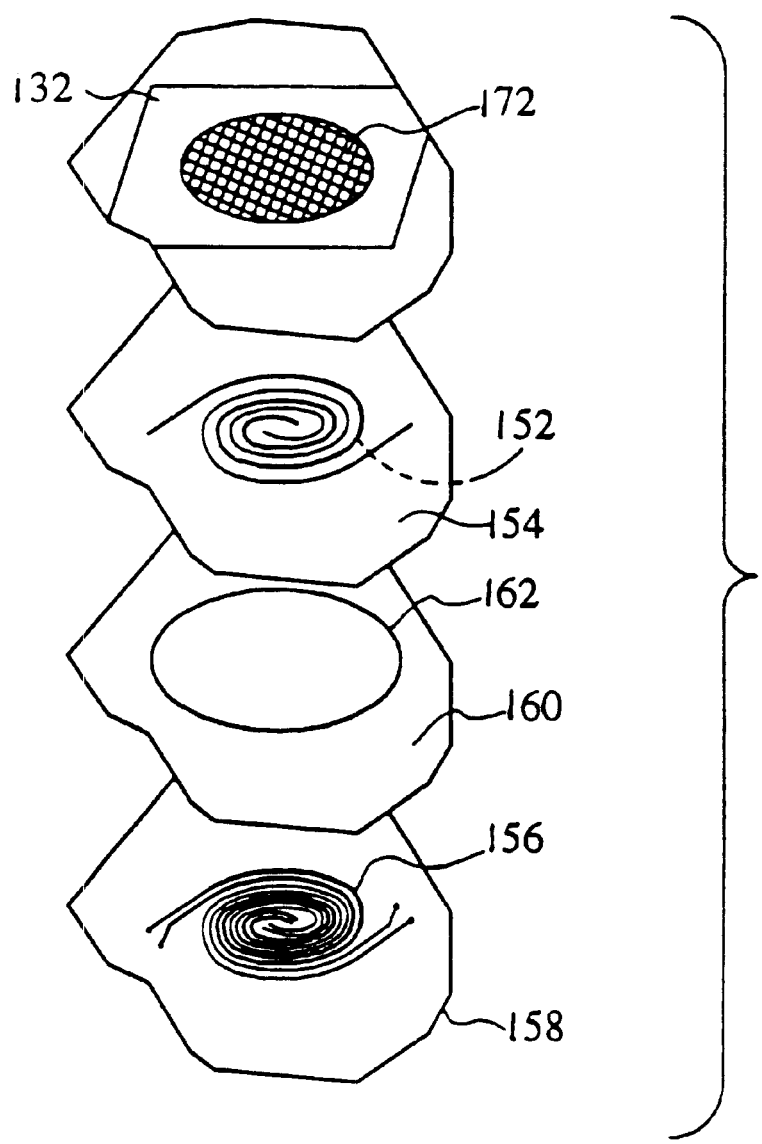
Figure 11:
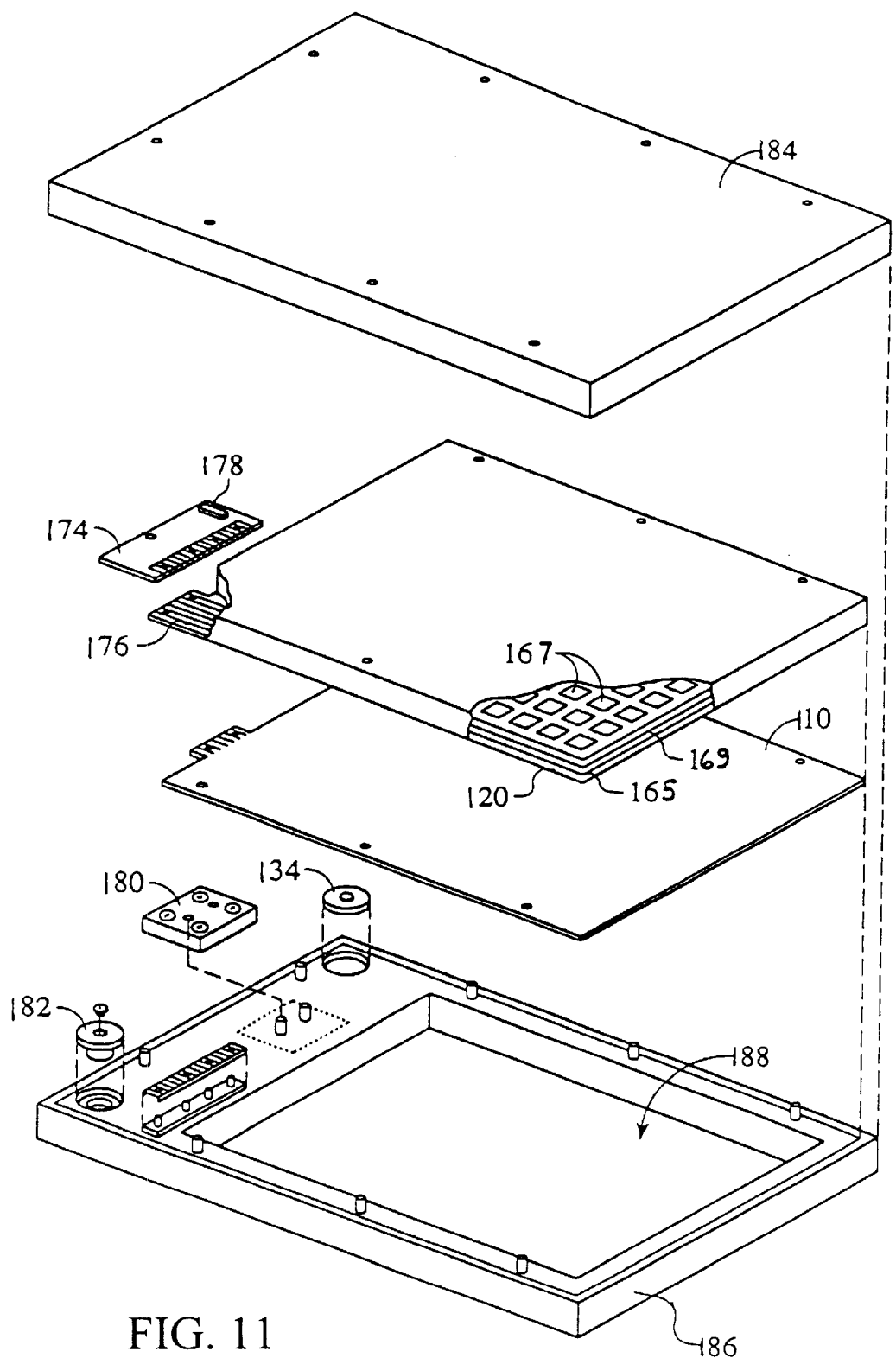
Figure 12:
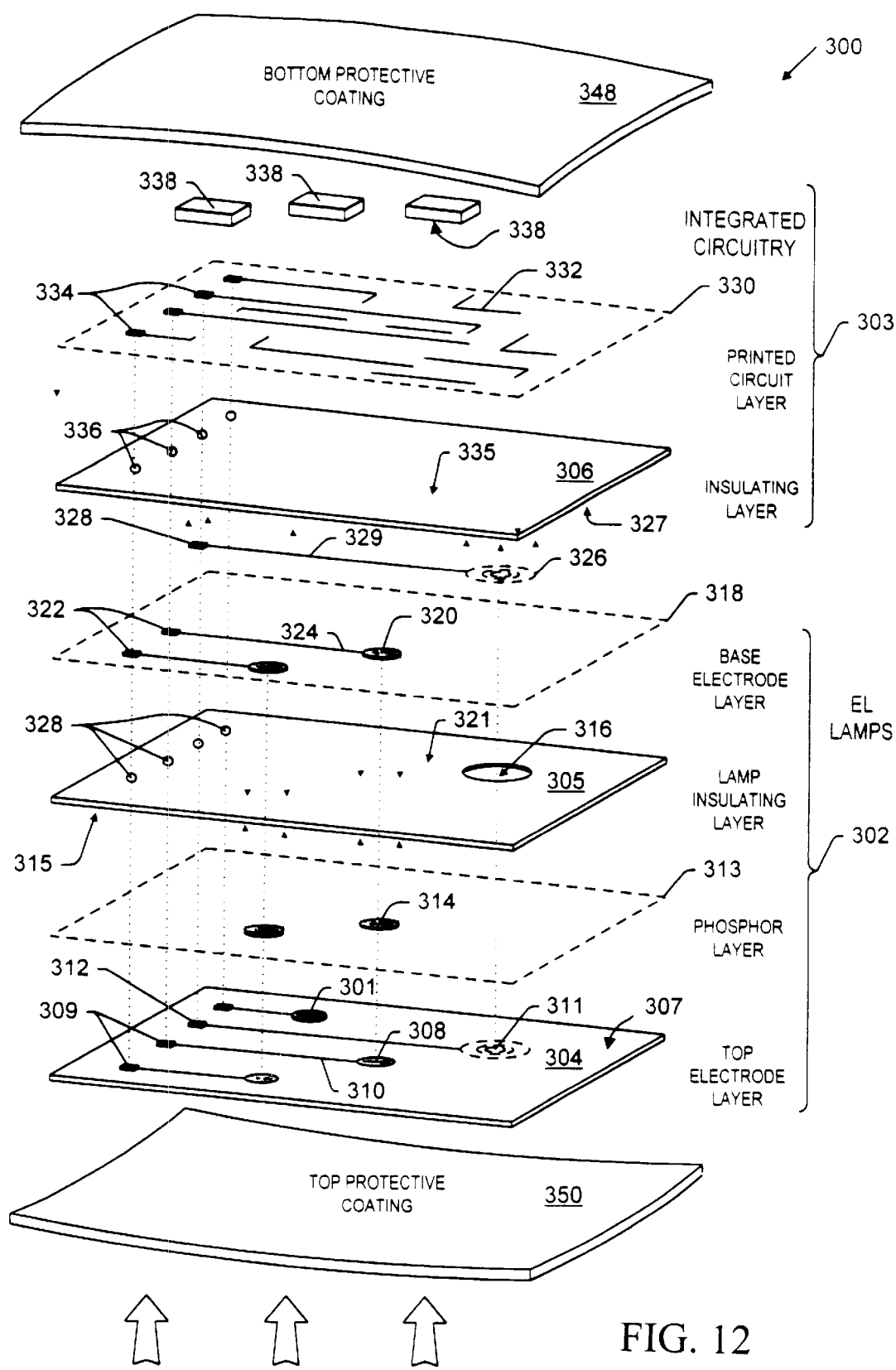

FIG. 3 provides an exploded view of a membrane switch according to the present invention;

FIG. 4 is a cross-section of a typical double-sided display sheet of the present invention;

FIG. 5 is a cross-section of an alternate embodiment of a double-sided display sheet according to the present invention;

FIG. 6 is a cross-section of another alternate embodiment of a double-sided display sheet according to the present invention.;

FIG. 7 is a block diagram of the typical electrical circuitry of the present invention;

FIG. 8 shows a typical layout for an icon bearing layer which is associated with a substrate in accord with an alternative embodiment of the present invention;

FIG. 9 is an exploded view of some of the layers of a typical substrate of FIG. 8, with most of the electrical circuitry removed;

FIG. 10 is another exploded view of a flexible membrane switch in accord with the present invention;

FIG. 11 is an exploded perspective view of electric circuitry and a housing associated with the embodiment of FIG. 8; and FIG. 12 is an exploded view of an integrated electronic thick film EL display device, the device including EL lamps formed by lamp layers, and circuitry layers forming circuitry for illuminating the EL lamps, the lamp layers and circuitry layers being integrated within a light-weight, space-saving modular unit in accordance with a third embodiment of the present invention.

BEST MODE FOR CARRYING OUT THE INVENTION

Figure 1:
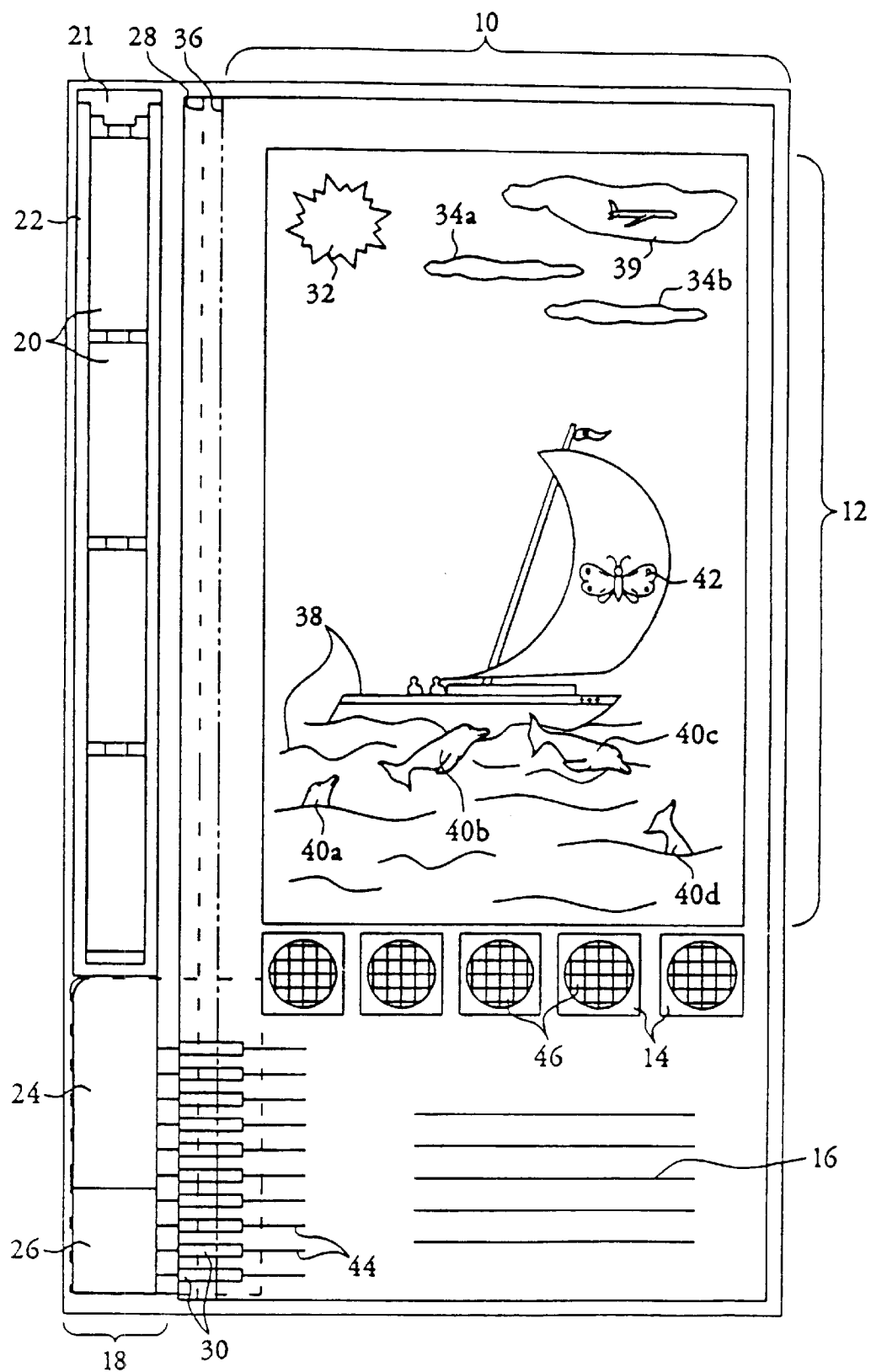
FIG. 1 shows a typical page layout for a character-bearing printable layer, according to a first embodiment of the present invention, and also shows an example of the spine of a book having the display pages of the present invention.

With reference to FIG. 1, a typical page layout for the character-bearing, printable layer 10 of a display page contains a graphics portion 12, a series of membrane switches 14, and text 16. Although the graphics, membrane switch, and text portions of the page are shown in separate regions for ease of illustration, they may be interspersed, e.g. with the text containing instructions to depress the membrane switch at the end of the line of text, or a membrane switch incorporated into the illustrated scene. Additionally, text may be illuminated according to the present invention.

Printable layer 10 contains some translucent regions and a layer of EL lamps underlies printable layer 10 with the individual lamps positioned in a pattern corresponding to those portions of the graphics which are to be illuminated. For example, one EL lamp may be positioned under sun 32. Another lamp may be positioned to illuminate two closely-spaced parts of the illustration, such as clouds 34a–b. The characters may be the result of printing a positive silhouette, such as sun 32, on the outer face of printable layer 10 and a negative silhouette with dark ink directly underneath the positive silhouette. This refinement confines the illumination of the EL lamp below a character to that selected character. The EL lamps and printing can be combined to achieve a variety of effects. For example, a character may be printed on a translucent portion of a material of a single color and then change color when illuminated by an EL lamp of a different color. The characters themselves may be illuminated, such as sun 32, or may be printed in dark ink and be backlighted when an EL lamp illuminates the background as is the case for the dark airplane in front of cloud 39. Characters may also be printed on the inner face only of printable layer 10, such as butterfly 42, so that illumination via EL lamp makes the character "appear" on the outer surface of printable layer 10. The graphics portion 12 may also contain non-activatable portions, such as at 38, which simply complete the illustrated scene.

A unique feature of the present invention is the sequencing of EL lamps to cause motion effects, such as animation. Individual EL lamps may be positioned beneath individual characters, e.g. the dolphin at each of positions 40a–d. When the appropriate switch is activated, the EL lamps luminance in a specified order, e.g. first the lamp at position 40a, then 40b, 40c, and finally 40d, giving the appearance of a jumping dolphin. When the sequencing circuitry is properly timed and ordered with the coordinating characters, animation effects may be achieved. In another instance, the characters may be printed on the inner surface of printable layer 10 in overlapping form and the EL lamps may be set at a rate designed to provide a smoother appearance of motion.

Activation of the EL lamps is caused by the membrane switches 14. A membrane switch may cause activation of one EL lamp and illumination of one character, as in sun 32 or butterfly 42, or activation of a series of EL lamps and a motion sequence within the graphics, as in the jumping dolphins at 40a–d.

The above-described printable layer 10 is presented as a single example of the top layer of a display page according to the present invention. Another display page having unique graphics, text, and EL lamp patterns may be affixed to the back of the first display page with the EL lamps facing inwardly and the character-bearing layers facing outwardly. The two together form a two-sided interactive EL display panel that serves as a sheet of a book. A plurality of display pages may be bound together in a book format, as with stitching at 28 and a fold line at 36 of FIG. 1.

The EL lamps of the assembled book preferably receive energy for luminescence from an internally housed source. Therefore, the assembled book preferably houses a power supply and circuitry common to the EL lamp patterns of each display page in a central area such as the spine 18 of the book, as illustrated in FIG. 1. The power to run the EL lamps may be supplied, e.g., by batteries 20 housed in a hollow tube 22 of spine 18 in conjunction with an inverter 26, also located within spine 18. Inverter 26 converts the DC voltage of the batteries into the AC voltage required to activate the EL lamps. Tube 22 is shown with a removable cap 21 at one end for replacement of the batteries 20. A battery input voltage in the range of 1½V to 12V may be used, with 6V preferred. Typically, the inverter output is at a voltage in the range of 80 to 160V and a frequency in the range of 400 to 2000 Hz, with 100V and 1200 Hz preferred. Sequencing circuit 24 is also shown located in spine 18 of FIG. 1 because in the illustrated example, a single sequencing circuit having a set pattern is used for the motion-sequenced graphics of each display page. Alternatively, different timing and ordering patterns may be used for each display page.

FIG. 1 also shows electrical leads 30 and wiring 44 connecting to the circuitry for the EL lamp patterns of each display page. The sheets of the book are aligned and preferably conductive epoxy, not shown, is then used to interconnect the circuitry of the display pages, the power supply, and the sequencing circuit. Alternatively, metal eyelet-type rivets may be used to interconnect the circuitry.

Figure 2:
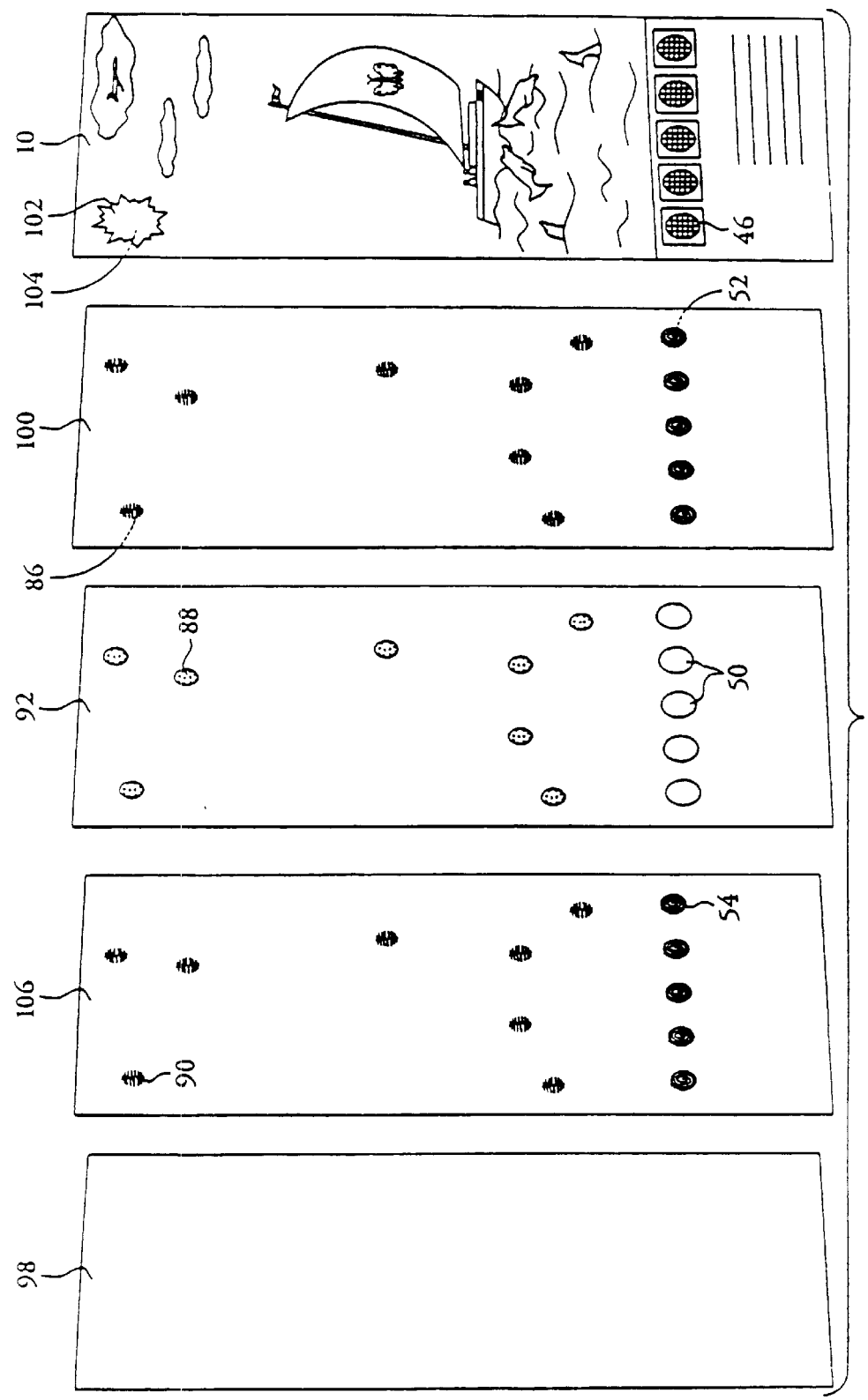
FIG. 2 is an exploded view of some of the layers of a typical display page of the present invention, with most of the electrical circuitry removed.

Referring to FIG. 2, character-bearing, printable layer 10 is shown with a printed positive silhouette 102 on its outer surface. A negative silhouette of the same character is printed on the backside, or inner surface, of printable layer 10, as indicated by 104. The characters may be printed with ink on the outer surface, inner surface, or both depending on the desired effect, as discussed above.

Below the printable layer 10 lies the EL lamp layer. The EL lamps of the present invention are preferably discrete cells which are situated close to printable layer 10 for maximum brightness of the overlying characters. For ease of illustration, the EL lamp layer has been separated into its components, but the connecting circuitry is not shown. The EL lamp layer shown is a typical EL polymer thick film with a top electrically conductive and light-transmissive ink pattern 86 serving as a top electrode and a bottom electrically conductive ink pattern 90 serving as a bottom electrode. Top electrode 86 is preferably disposed on the underside, or inner surface, of layer 100. Bottom electrode 90 is preferably disposed on the top, or outer surface, of layer 106. "Inner" and "outer" surfaces, as used here, refer to positions relative to a core or base, such as base substrate 98, of a typical display page or display sheet. Between the two electrodes lies the EL phosphor 88, which may also be in the form of an ink, and a dielectric 92. The electrodes 86 and 90 are aligned with the EL phosphor 88 and dielectric material 92 to form the EL lamp. Top electrode 86 is made light-transmissive to emit the luminescence of EL phosphor 88. A pattern of EL lamps is shown in FIG. 2 corresponding to selected characters of printable layer 10.

Although the various components of the EL lamps are shown as being incorporated in different segments of film, such as 100, 92 and 106, the present invention may be manufactured with the EL lamps being "printed" directly on the inner surface of printable layer 10. The components are thus laid down as successive coatings of first conductive ink, phosphor, dielectric matrix material, and second conductive ink. A combination of the coating and separate layer methods may be used to effectively combine layers 10 and 100 or 106 and 98, so that the conductive ink patterns are printed directly on layers 10 or 98 and only a separate dielectric and phosphor layer is between them. See FIG. 5. This combination of layers is also applicable to the conductive ink traces for the membrane switches, described below. Other types of EL lamps, such as those utilizing foil electrodes or phosphor-impregnated resins may also be used.

Also below printable layer 10 are the inner components of membrane switches 14. FIGS. 2 and 3 illustrate the design of membrane switch 14, without connecting circuitry. The membrane switch includes a top pair of parallel spiral conductive ink traces 52 on a first surface, such as the underside of layer 100 or the inner surface of printable layer 10, and a bottom pair of parallel spiral conductive ink traces 54 on a second surface, such as the top surface of layer 106, as in FIG. 2, or base substrate 98, as in FIG. 3. The two sets of spirals are positioned to face each other, but are spaced apart with a spacer layer of predetermined thickness. The spacer layer contains apertures 50 which are aligned with the top and bottom sets of spirals 52 and 54, respectively. Printable layer 10 is printed with activation regions 46 of the membrane switches 14 indicating where the user should depress the switch. When the activation region 46 of a switch is depressed, top spiral set 52 comes into contact with bottom spiral set 54 through aperture 50, thus activating the switch and closing a circuit.

Although the spacer layer containing apertures 50 is shown in FIG. 2 as layer 92, i.e. the dielectric layer of the EL lamps, this is not a requirement. The spacer layer for membrane switches 14 may be completely separate from the EL lamp components and this is especially true if the EL lamps are formed as ink and resin coatings on the inner surface of printable layer 10. The layers of membrane switches 14 which contain the top set of spirals 52 and the activation regions 46 are preferably made of flexible material such that depression of activation region 46 causes sufficient deflection of those layers to allow contact of the top and bottom sets of spirals 52 and 54. A material such as Mylar offering flexibility for light-pressure touch activation and durability for use in children's books is preferred.

The display pages of the present invention are preferably constructed using non-porous, flexible polymer substrate materials such as Mylar. Paper or fabric may also be used. It may be desirable to use core substrates and spacer layers that are semi-rigid, however, for durability. The printable layers are preferably 0.003 to 0.020" thick. The base substrate 98 of FIG. 2 is preferably 0.010 to 0.035" thick. Layers 100 and 106 of FIG. 2 are preferably 0.010 to 0.020" thick. The dielectric layer 92 varies depending on the voltage used, but a thickness of 0.010 to 0.030" is typical.

The printable layer 10 and underlying EL lamp and internal membrane switch layers 100, 92, and 106, are repeated in reverse form on the flip side of base or core substrate 98. Thus, FIG. 4 shows a cross-section of a complete double-sided, typical display sheet of the present invention. Layers 10, 100, 92, 106 and 98 are followed in order by a layer 106', similar to 106, a layer 92', similar to 92, a layer 100', similar to 100, and another character-bearing, printable layer 10', having a different scene in its graphics region and different text than printable layer 10. Preferably, the membrane switches on a first display page, or one side, shown e.g. as printable layer 10, of a double-sided display sheet, are not located directly opposite the membrane switches on the attached display page, or second side, shown e.g. as printable layer 10', of a double-sided display sheet. This placement avoids undesired activation which would waste battery power. Layers 92 and 92' are shown containing EL phosphors 88 and 88', respectively, and apertures 50 and 50', respectively. Conductive patterns and traces 86 and 52 are indicated on layer 100, as are 86' and 52' on 100'. Similarly, conductive patterns and traces 90 and 54 are indicated on layer 106, as are 90' and 54' on 106'. Membrane switch activation regions 46 and 46' are also shown on the printable layers. FIG. 4 shows positions A-D as possible locations for characters which are backlighted by the EL lamps. Additionally, the assembled double-sided display sheet may contain laminated coverings for durability.

One alternative structure, described above and illustrated in FIG. 5, has a portion, i.e. the light-transmissive top electrodes 86 and 86', of each pattern of EL lamps printed on the back of the printable layer 10 or 10', eliminating layers 100 and 100'. The EL phosphor material 88 or 88' may also be included in the portion of EL lamp that is printed on the inner faces of printable layers 10 and 10'. FIG. 5 also shows layers 106 and 106' removed, as compared with FIG. 4. The bottom electrodes 90 and 90' are printed, then, on either the inner faces of dielectric layers 92 and 92' or on the surfaces of base substrate 98.

A further alternative structure for the display sheet of the present invention has a single EL film layer forming a core that may be used to illuminate both display pages of a double-sided display sheet, as illustrated in FIG. 6. This requires the EL film layer to be light-transmissive in directions towards both display pages, however. FIG. 6 shows a single EL film layer, i.e., the EL phosphor dielectric material, and top and bottom electrodes, serving to illuminate characters on both of the printable layers 10 and 10'. One EL lamp causes illumination at position A on layer 10 because its light-transmissive portion, 86 and 88, is directed toward layer 10. The other EL lamp has its light-transmissive portion, 86' and 88', directed toward layer 10' and thus causes illumination at position D. EL lamps that luminesce in both directions simultaneously may also be used. Note that in FIG. 6, the internal portions of the membrane switches are shown in adjacent positions of a single layer, but each has an activation region 46 or 46' in printable layer 10 or 10', as appropriate.

FIG. 7 contains an example of the electrical circuitry for a first page 60 and a succeeding page 62. Each page shown contains three simple EL lamps: 65, 67, and 69 on page 1 and 75, 77, and 79 on page n. The pages also each contain a sequenced series of EL lamps: 71a–f on page 1 and 81a–f on page n. All of the EL lamps are activatable by membrane switches whose activation regions are printed on the character-bearing printable layers overlying the lamps. For simplicity, the two pages contain identical EL lamp patterns. Different patterns may be used on the pages, however.

The membrane switches 14 of the present invention are preferably of a double pole design, meaning that two poles of the switch are closed simultaneously. FIG. 7 shows the two poles of a single membrane switch as 64a–b. Activation of the membrane switch operably connected to EL lamp 65 closes the circuit at poles 64a at 60 and 64b at 60' and allows the AC voltage provided by DC voltage 84 and inverter 26 to cause luminescence of EL lamp 65. Simple EL lamp page circuitry 72 similarly allows luminescence of lamps 67 upon activation of switch 66a–b and lamp 69 upon activation of switch 68a–b. In the same manner, simple circuitry 82 for page n allows luminescence of lamps 75, 77, and 79 upon activation of switches 74a–b, 76a–b, and 78a–b respectively, with poles located at 62 and 62'.

Double-pole membrane switches are also utilized for activation of the sequenced series of EL lamps. Page 1 shows EL lamps series 71a–f activated by switch 70a–b. When the circuit is closed, sequencing circuit 24 through circuitry 58 causes luminescence of EL lamps 71a–f according to a set timing and ordering pattern. The sequencing circuit 24 is also operably connected to page n via sequencing circuitry 58. Thus, activation of switch 80a–b causes sequenced luminescence of EL lamp series 81a–f.

Each display page of the present invention is similarly connected to preferably both the sequencing circuitry 58 and the circuitry for simple luminescence, depending on the illumination requirements of the page. The placement and number of EL lamps for the EL lamp pattern of each page may vary. Additional electrical sequencing patterns may be set in the sequencing circuit, so that the timing and order of illumination on the various pages having sequenced lamp series need not be identical. Also, more than one sequenced lamp series may be present on a single page. The multiple sequenced lamp series on a page may contain different electrical sequencing patterns.

The double-pole membrane switch design allows the single electronic sequencing circuit 24 shown in FIG. 7 to control the sequenced series of EL lamps on all pages of the book individually. The first pole 70a, e.g., controls the sequencing circuit 24 and the second pole 70b connects the specific page, here 60', to the return side of the inverter 26.

The present invention provides a unique usage for EL lamps and membrane switches that will easily find application for educational and entertainment purposes.

With reference to FIGS. 8 and 9, a second embodiment of the present invention is shown including a typical page layout for an icon bearing, printable layer 110 of a substrate that contains a graphics portion 112 and a text portion 114. The substrate may be a greeting card, a page of a book, a panel or other sheet material. For purposes of description, the substrate will be an interactive board game. Graphics portion 112 and text portion 114 are shown in separate regions for ease of illustration and may be interspersed, e.g., with the text positioned proximate to a particular graphic providing detailed information about the same. Additionally, text may be illuminated according to the present invention.

Layer 110 typically includes two sets of icons. A first set of icons 116, shown with solid lines, are formed to be viewable with the unaided eye on an essentially continuous basis. In this manner, icons 116 reflect light which is incident thereon. A second set of icons 118, shown in dashed lines, are formed to be selectively viewable with the unaided eye. Typically, icons 118 are translucent regions, which are printed on the inner face only of layer 110. A layer of EL material 120 underlies layer 110 and is formed to luminesce in areas adjacent to the translucent regions, which correspond to icons 118. For example, an EL area may be positioned under sun 122, as well as areas 122a–c. Another EL area may be positioned to illuminate two closely-spaced parts of the illustration, such as clouds 124a–b. The icons may be the result of printing a positive silhouette, such as sun 122, on the outer face of printable layer 110 and a negative silhouette with dark ink directly underneath layer 110 adjacent to the positive silhouette and proximate to the areas 122a–c. This refinement confines the illumination of the EL material to a region of layer 110 associated with icons of either the first 116 or second 118 set. In this manner, illumination of icons 118 via EL material allows icons to seem as though they "appear out-of nowhere" on the outer surface of printable layer 110. EL material 120 and printing can be combined to achieve a variety of effects. For example, a graphic may be printed on a translucent portion of a material of a single color and then change color when illuminated by an EL device of a different color. The icons themselves of the first set 116 may be illuminated, such as sun 122, or may be printed in dark ink and be backlighted when an EL device illuminates the background as is the case for the dark airplane in front of cloud 126. The graphics portion 112 may also contain non-activatable portions which simply complete the illustrated scene.

The shapes of the translucent regions are logically associated with one or more of the icons of the first set 116. For example, water 130 may be one of the icons of first set 116 and may have, associated therewith, dolphins 130a–d, which may be four of the icons of the second set 118. Dolphins 130a–d would not be viewable until EL material 120 is activated. To activate EL material 120, a plurality of switches/buttons 132 may be employed, or a microphone may be connected to allow voice activation of the EL material. Although switches are shown positioned in a region separate from graphics portion 112, it is preferred that switches 132 be positioned so as to lie underneath dolphins 130a–d. With this design, it is necessary to use flexible membrane switches, which are well known in the art. To operate the switches 132, it is understood that both EL material 120 and layer 110 must also be formed from a flexible material.

By properly sequencing the illumination of EL material 120, an illusion of motion may be achieved with respect to icons 118. In another instance, the icons may be printed on the inner surface of layer 110 in overlapping form, and the EL material may be set at a rate designed to provide a smoother appearance of motion. Overlapping EL areas could include sun 122b and cloud 117. Sun 122b and cloud 117 may be disposed so that they are not viewable until the EL area positioned underneath the same illuminates, as discussed above with respect to icons 118. In this fashion, at the initiation of the illumination sequence of 122c, 122b and sun 122a, the EL material associated with cloud 117 would be illuminated. Upon illumination of cloud 122b, EL material corresponding to letter 149 extinguishes, momentarily leaving only cloud 122b illuminated. By carefully overlapping a succession of similar images in this manner, a relatively smooth appearance of motion may be achieved.

A sound generator, shown more clearly in FIG. 4, is coupled to a speaker 134 to produce an audible response which may be associated with icons of the first 116 second 118 sets. When the sequencing circuitry is properly timed and ordered with the icons and audible responses, visual animation may be achieved with corresponding audio accompaniment. For example, upon illumination of dolphin 130a, sound generator may produce the sound of breaking water to imitate the sound of a dolphin emerging from water 130. During the illumination of dolphins 130b–c, sound generator may produce the sounds of the dolphin clatter, or speech. In this fashion, the sound generator may produce a sequence of audible responses associated with the sequence of illumination of icons of the first 116 and second 118 sets. Further, each audible response in a sequence may be uniquely associated with the illumination of a particular icon of either the first 116 or second 118 sets.

If an amusing scenario is to be produced, the sound generator may imitate the sound of a jet air-liner, missile or Apollo-NASA Communications sequence during the illumination of dolphins 130b–c, exaggerating the flight of the same across water 130. Finally, upon illumination of dolphin 130d, sound generator may produce the sound of a large splash, emphasizing the return of the dolphin to water 130. The combined audio visual stimuli provides the full effects of a motion picture.

Layer 110 is shown with a printed positive silhouette 122 on its outer surface. A negative silhouette 122 of the same icon is printed on the backside, or inner surface, of layer 110, as also indicated by 122a–c. The icons may be printed with ink on the outer surface, inner surface, or both depending on the desired effect, as discussed above. Below layer 110 lies the EL material 120. EL material 120 of the present invention includes a plurality of electroluminescent regions each of which comprises of EL phosphor 138 disposed between a top conductor 140 and a bottom conductor 142. Preferably, each electroluminescent region is situated proximate to layer 110 for maximum brightness of the overlying icons of second set 118. For ease of illustration, EL material 120 has been separated into its components, but the connecting circuitry is not shown. Top conductor 140 is typically formed on EL polymer thick-film as an electrically conductive ink. Preferably, top conductor 140 is disposed on the underside, or inner surface, of layer 144 proximate to graphics of first set 118 and is light-transmissive to allow light from EL phosphor 138 to pass therethrough. Bottom electrode 142 is preferably disposed on the top, or outer surface, of layer 146. "Inner" and "outer" surfaces, as used here, refer to positions relative to a core or base, such as base substrate 148, of a typical display page or display sheet. EL phosphor 138 is typically in the form of a conductive ink disposed on a dielectric 150. Electroluminescent regions, shown in FIG. 9, correspond to selected icons of layer 110.

Although the various components of EL material 120 are shown as being incorporated in different segments of film, such as 144, 146 and 150, the present invention may be manufactured with all components of EL material 120 being "printed" directly on the inner surface of layer 110. The components are thus laid down as successive coatings of first conductive ink, phosphor, dielectric matrix material, and second conductive ink. A combination of the coating and separate layer methods may be used to effectively combine layers 110 and 144 or 146 and 148, so that the conductive ink patterns are printed directly on layers 110 or 148 and only a separate dielectric and phosphor layer is between them. This combination of layers is also applicable to the conductive ink traces for the membrane switches, described below. Other types of EL material, such as those utilizing foil electrodes or phosphor-impregnated resins may also be used.

Referring also to FIG. 10, below selected icons are the inner components of flexible membrane switches 132. Switches 132 are shown without connecting circuitry for ease of discussion. Each membrane switch 132 includes a top pair of parallel spiral conductive ink traces 152 on a first surface, such as the underside of layer 154 and a bottom pair of parallel spiral conductive ink traces 156 on a second surface, such as the top surface of layer 158. The two sets of spirals are positioned to face each other, but are spaced apart with a spacer layer 160 of predetermined thickness. Spacer layer 160 contains apertures 162 which are aligned with the top and bottom sets of spirals 152 and 156, respectively. As discussed above, in the preferred embodiment, membrane switches 132 may be disposed underneath one of the electroluminescent regions of EL layer 120 which switch 132 will cause to illuminate. Upon depressing the selected icon on layer 110, the top spiral set 152 comes into contact with bottom spiral set 154 through aperture 150, thus activating switch 132, closing a circuit and illuminating electroluminescent regions of EL layer 120. To this end, switch 132 is typically positioned proximate to layer 148, with layer 110 and all of the intervening layers between switch 132 and layer 110 being flexible. Upon depressing the appropriate switch 132, an icon of the first set 116 may be provided motion by icons of the second set 118. For example, the sound generator may prompt a user with an audible response as follows: "Watch the sun rise". After hearing the aforementioned audible response, a user would press on icon 122. This would cause switch 132, shown on layer 148, to cause phosphor A to irradiate light. Timing circuitry, discussed later with respect to FIG. 11, would sequentially illuminate and unilluminate phosphor B, C, and D. This in turn would cause icons 122c, 122b and 122a to appear and disappear, leaving only icon 122 illuminated. After the illumination sequence of 122c, 122b and 122a has ended, an appropriate audible response could be generated.

In addition, some or all of switches 132 may not be disposed underneath EL material 120. Rather, some flexible membrane switches 164 may be formed in the same layers as EL material 120. In this manner, switch 164 may be disposed in the graphic portion 112 underneath a graphic associated with the first set 116, to indicate where a user can locate switch 164. Switch 164 includes a top pair of parallel spiral conductive ink traces 166 which may be disposed on surface 144, as well as a bottom pair of parallel spiral conductive ink traces 168, which may be on the top surface of layer 146, or base substrate 148. An aperture 170 may be positioned between top 166 and bottom 168 traces to perform the same functions as aperture 158, discussed above. Switches not included in the graphic portion 112 typically have, associated therewith, an activation region 172 to indicate where the user should depress switch 164 to activate EL material 120. When the activation region 172 of a switch is depressed, top spiral set comes into contact with bottom spiral set, as discussed above.

Referring also to FIG. 11, an advantage with having the EL material 120 and layer 110 disposed above switch 130 is to make the present invention easily adaptable to existing board games that provide audio stimuli. Such games typically employ sound cards activated by flexible membrane switches. By layering both the EL material 120 and layer 110 over the existing flexible membrane switches, an existing audio board game may be easily upgraded to provide visual stimuli. The existing flexible membrane switches are coupled to both the EL material 120 and the sound generator to simultaneously activate both audio and visual stimuli. The visual stimuli provided may be designed to enhance the existing audio programming of the board game. Alternatively, many of the preexisting board games may be easily reprogrammed to change the sounds generated to enhance the visual stimuli. In this manner, existing board games may be easily and inexpensively altered to keep apace with the rapidly changing trends of children's entertainment.

An additional benefit with the layered design concerns the efficient use of substrate on which the switches and EL material are disposed. Specifically, with the layered design, more switches per unit area may be disposed in the board game, providing more interactive devices for a user. For example, an array or matrix of switches may be included. Top conductive traces 165 may be disposed spaced apart from bottom conductive ink traces 167, with a plurality of corresponding apertures 169 disposed in an insulative layer therebetween, with corresponding electroluminescent regions being present. The advantage of having more interactive devices is that the game becomes more suitable for children of younger years. By placing the switch 130 underneath the icon which is the subject of attention, a one-to-one correspondence is facilitated between the icon and the visual response expected. This concept is easily demonstrated by considering the sound generator producing the aforementioned audible response of "Watch the sun rise". Upon hearing this prompt, a user would merely press on icon 122 to elicit the visual response discussed above, thereby providing a one-to-one correspondence between icon 122 and the visual response expected. If the sound generator prompted the user to "see the dolphins jump", the aforementioned correspondence is not present. The dolphins may not be seen, precluding the user from knowing where a switch is positioned to elicit the usual stimuli expected, i.e., the sequential illumination of dolphins 130a–d. Rather, a user would have to embark on an abstract association of water 130 with dolphins 130a–d. After making the aforementioned association, a user would understand the need to press on icon 130 to activate icons 130a–d. Many users of the present invention would not have developed the cognitive ability to make abstract associations. By placing switch 130 underneath an icon which is the subject of attention, less abstract thought processes need be utilized for a user to enjoy the interactive device. Simply put, the device becomes more suitable for users who have not developed the cognitive abilities necessary to successfully comprehend abstract associations.

The substrate of the present invention is preferably constructed using non-porous, flexible polymer substrate materials such as Mylar. Paper or fabric may also be used. It may be desirable to use core substrates and spacer layers that are semi-rigid, however, for durability. The printable layers are preferably 0.003 to 0.020" thick. The base substrate 148 is preferably 0.010 to 0.035" thick. Layers 144 and 146 are preferably 0.010 to 0.020" thick. The dielectric layer 150 varies depending on the voltage used, but a thickness of 0.010 to 0.030" is typical. Comparable dimension may be employed for flexible membrane switch layers 154, 158 and 160.

Each of the flexible membrane switches 132 is coupled to a printed circuit board (PCB) 174 via traces 176. A combination sound generator and sequencing circuit is disposed on the PCB 174 and may take the form of an integrated circuit coupled to speaker 134. A suitable power source, such as batteries 180, are provided to power the device. A power button 182 is coupled to the power source to selectively actuate the interactive device. A housing is provided which includes upper 184 and lower 186 casings. Upper casing 184 includes a window 188. Additional openings are provided to mount button 182 and speaker 134 so that they may be operationally coupled to upper casing 184. Layer 110 is mounted to be adjacent to window 188, with EL material 120 disposed adjacent thereto. Spaced apart from the EL material 120 is an array of flexible membrane switches.

Disposed between the EL material 120 and the switch array are traces 176, with lower casing 186 fastening to upper casing 184 via screws or the like.

FIG. 12 illustrates an exploded view of an integrated electronic thick film EL display device at 300 in accordance with a third embodiment of the present invention, the device 300 including: a first set of layers 302 forming a plurality of EL lamps, flexible membrane switches, and a speaker; and a second set of layers 303 forming circuitry providing for selective illumination of the lamps and generation of sounds via the speaker in response to activation of the switches as further explained below. In accordance with a fabrication process according to the present invention, the first and second sets of layers 302 and 303 are integrated within the device 300 which forms a compact and light-weight modular unit which does not require a frame or chassis. The display device is therefore suitable for mounting on a wall.

An EL display device of the type depicted may be used in a wide variety of products including electronic display systems, computer screens, watches, night lights, greeting cards, pages of a book, and a point of purchase display. For purposes of description, the display device 300 is assumed to be an interactive wall mounted display panel having graphics portions and text portions similar to the printable layer 10 (FIG. 1) of the display page described above.

The first set of layers 302 of the device 300 include a substrate 304 formed using transparent or translucent plastic sheeting, and a lamp insulating layer 305 formed by an electrically non-reactive material, such as barium combined with a liquid binding material for hardening layer 305 to desired electrical and mechanical characteristics. The second set of layers includes a circuit insulating layer 306 formed by an electrically non-reactive material, such as barium combined with a liquid binding material for hardening layer 328 to desired electrical and mechanical characteristics.

The substrate 304 includes a pattern of translucent top electrodes 308 comprising translucent conductive material formed on a bottom surface 306 of the substrate. The top electrodes 308 are connected to corresponding ones of a plurality of conductive pads 309 via corresponding ones of a plurality of interconnects 310, the pad and interconnects also being formed on surface 307 of the substrate. Also formed on surface 307 of the substrate is: a first switch contact 311 having at least one top pair of parallel spiral conductive ink traces connected to a corresponding pad 312 via a corresponding one of the interconnects 310; and a speaker 301 connected to a corresponding one of the pads via a corresponding one the interconnects. In one embodiment, the top electrodes 308, first switch contact 311, pads 309 and 312, and interconnects 310 are created by forming a layer of indium-tin-oxide (ITO) over surface 307 of the substrate, and patterning the ITO layer in accordance with a patterning process including the steps of photoresistive masking and etching. In another embodiment, a silk screening process is used to form the top electrodes, first switch contact, pads, and interconnects. In an embodiment, the speaker 301 is formed from electromagnetic material. In another embodiment, the speaker 301 is formed from piezoelectric material.

A phosphor layer 313 having a pattern of electroluminescent phosphor regions 314 is formed on a top surface 315 of the illumination assembly insulating layer 305, the phosphor regions 314 being formed to align with corresponding ones of the top electrodes 308. The phosphor layer 313 is formed from an electrically reactive phosphorescent material combined with a liquid binding material which is hardened to desired electrical and mechanical characteristics. In the depicted embodiment, the phosphor layer 313 is patterned to define phosphor regions 314 in accordance with a patterning process including the steps of photoresistive masking and etching. In an alternative embodiment, the phosphor layer may be silk screened to form the phosphor regions 314. In another alternative embodiment, the phosphor layer is not patterned into regions, but rather overlies the entire substrate 304. The insulating layer 305 includes an aperture 316 formed therethrough, the aperture 316 being formed to align with the first switch contact 311.

A base electrode layer 318 is formed on a bottom surface 321 of insulating layer 305, the base electrode layer 318 having a pattern of base electrodes 320, and a plurality of conductive pads 322 connected to corresponding ones of the electrodes 320 via corresponding ones of a plurality of interconnects 324. The pads 322 of the base electrode layer 318 are electrically connected to corresponding ones of the pads 309 formed on substrate 304 via conductive material passing through a plurality of holes 328 formed through insulating layer 305. The insulating layer 305 serves to isolate the phosphor layer 313 from the base electrode layer 318. In an embodiment, the insulating layer 305 has no specific size or shape pattern relative to substrate 304.

The base electrode layer 318 is formed by a layer of electrically conductive material. In the depicted embodiment, the base electrodes 320 are formed by depositing a layer of silver-ink over the top surface 321 of the insulating layer 305, and performing a patterning process including the steps of photoresistive masking and etching. In an alternative embodiment, the base electrode layer 318 is silk screened to form the base electrodes 320. In another alternative embodiment, the base electrode layer 318 overlies the entire insulating layer 305 and is not patterned into electrode regions. When alternating current is applied to a corresponding pair of the top electrodes 305 and base electrodes 316, the corresponding phosphor region 314 disposed therebetween is illuminated, and light passes through the corresponding translucent top electrode 305 toward the viewing side of the display device which is opposite to the bottom surface 307 of the substrate of the display device.

Also optionally, at least one second switch contact 326 is formed on a top surface 327 of the circuit insulating layer 327, the second switch contact having a pair of parallel spiral conductive ink traces connected to a corresponding pad 328 via a corresponding interconnect 329, the conductive ink traces of the second switch contact 326 being formed to align with the corresponding first switch contact 311 and aperture 316.

The display device 300 may also include additional membrane switches (not shown) disposed below the illumination assembly layers 302, that is between layers 302 and layers 303. As described above, each switch may include an imprinted activation region which, when depressed by the user, closes the circuit for at least one Illumination assembly on the page and thereby causes activation of the illumination assembly and illumination of the overlying character.

A printed circuit layer 330 is formed on a bottom surface 335 of the circuit insulating layer 306, the printed circuit layer having a plurality of conductive segments 332, and a plurality of conductive pads 334 for connecting corresponding ones of the segments 332 to corresponding ones of the pads 322, 328, 309, and 312 of the Illumination assembly layers via conductive material formed to pass through a plurality of holes 336 formed in the circuit insulating layer 306 and through the holes 328 of layer 305 respectively. The circuitry layers 303 of the display device further include a plurality of surface mount electronic components 338 having electrical contacts (not shown) connected to corresponding ones of the conductive segments 332.

The circuit insulating layer 306 serves to isolate the bottom electrode layer 318 from external sources of electrical shorting or grounding. The printed circuit layer 330 is formed using an electrically conductive material. In an embodiment, the printed circuit layer 330 is formed by depositing a layer of silver ink over the bottom surface 335 of layer 306, and then performing a patterning process including the steps of photoresistive masking and etching to precisely form the conductive segments 332 and pads 334 in a predetermined pattern to achieve desired circuit connections and to assure adequate physical distance between the segments 332 to prevent shorting and grounding of the segments.

The electronic components 338 include power supply components (e.g., a battery), transistors, resistors, capacitors, switches, diodes, oscillators, and integrated circuits providing logic and timing functions for achieving sound generation functions and illumination sequencing functions as described above. The electrical contacts of the components 338 may be bonded to the conductive segments 332 by means of a hot mechanical bonding process such as soldering, or by means of a cold mechanical bonding process such as conductive epoxy, or other non-impeding adhesives. The display device 300 further includes a bottom protective coating layer 348 formed over layer 330 to protect the components 338, and a top protective coating layer 350 formed to protect layer 304. The protective layers 348 and 350, which form a protective envelope around the device 300, each comprise an electrically non-reactive material which protects the integrity of the layers of the device 300, and which serves as an electrical insulator to protect the assembly from an external source of grounding. The protective layers 348 and 350 may be formed by any of a variety of processes including cold (PSA) lamination [What does "PSA" stand for ?], hot melt bond lamination, shrink-wrapping techniques, atomized spray liquid coating, brushing, silk screening, and tape casting. In one embodiment, the layers 348 and 350 are formed using a polyester sheeting.

Manufacturing of the device 300 may be achieved by performing the above described process steps either manually or in accordance with an automated fabrication process utilizing a robotic apparatus. Because the EL display device 300 includes the printed circuit layer 330 and surface mount electronic components 338 integrated in a modular package with the Illumination assembly layers 302, it is not necessary that the display device 300 be mounted to a chassis and coupled to a separate printed circuit board as is required with the use of prior art EL display panels. Therefore, the EL display device 300 provides advantages over prior art EL panel devices in terms of lower manufacturing costs, lighter weight, and smaller size.

Although the present invention has been particularly shown and described above with reference to three specific embodiments, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. An integrated electroluminescent display device comprising:
    at least one illumination assembly formed by a first set of layers, said illumination assembly including a first electrode, a second electrode, a layer of electroluminescent material disposed between said first and second electrodes, and a plurality of conductive leads connected to corresponding ones of said first and second electrodes, said first electrode being translucent;
    a printed circuit layer having a plurality of conductive segments connected to corresponding ones of said first and second electrodes via said conductive leads; and,
    an electronic component layer including electronic components having electrical contacts connected to corresponding ones of said segments of said printed circuit layer, said electronic components providing for selective illumination of said illumination assembly;
    wherein said printed circuit layer is disposed in a substantially parallel and contiguous relationship with said first set of layers.

2. An integrated electroluminescent display device as recited in claim 1 further comprising a protective coating forming an envelope surrounding said first set of layers, said printed circuit layer, and electronic component layer.

3. An integrated electroluminescent display device as recited in claim 1 wherein said first set of layers comprises:
    a substrate formed of translucent material, and having said first electrode formed on a surface thereof, said first electrode having a surface that is contiguous with said layer of electro luminescent material; and
    a first insulating layer formed by an electrically non-reactive material, said first insulating layer for isolating said electroluminescent material from said second electrode.

4. An integrated electroluminescent display device as recited in claim 3 wherein said printed circuit layer further comprises a second insulating layer providing for isolation of said conductive segments from said second electrode, said conductive segments being formed on a first surface, of said second insulating layer.

5. An integrated electroluminescent display device as recited in claim 1 wherein said electronic components comprise a battery providing power for illumination of said illumination assembly.

6. An integrated electroluminescent display device as recited in claim 1 wherein said electronic components comprise surface mount components.

7. An integrated electroluminescent display device as recited in claim 4 further comprising at least one membrane switch including:
    a first contact formed on said surface of said substrate; and
    a second contact formed on a second surface of said second insulating layer which is opposite said first surface, at least one of said first and second contacts being connected to a corresponding one of said segments of said printed circuit layer, said first insulating layer including a hole formed there through, said first and second contacts and said hole being aligned so that said switch is activated upon said first contact being brought into contact with said second contact, said electronic components being responsive to said activation of said switch.

8. An integrated electroluminescent display device as recited in claim 4 further comprising a speaker formed on said substrate, said speaker being electrically coupled with said electronic component layer via through holes formed through said first insulating layer and said second insulating layer.

9. An integrated electroluminescent display device as recited in claim 1 wherein said electroluminescent material comprises phosphor.

10. An integrated electroluminescent display device as recited in claim 1 wherein:
    said first set of layers further includes a printed layer bearing a plurality of icons, each of said icons being associated with one of a first set and a second set of icons, said illumination assemblies forming a pattern corresponding to said second set of icons; and
    said electronic components provides for selective illumination of said illumination assemblies to create an illusion of movement of at least one of said first set of icons by illuminating said second set of icons in accordance with a predetermined sequence.

11. An interactive book as recited in claim 1 wherein said first set of layers further comprises at least one printable layer printed with characters, at least one of said illumination assemblies being positioned to underlie a corresponding one of said characters.

12. An interactive book as recited in claim 11 wherein said electronic component layer further comprises a sequencing circuit providing variable timing and ordering of said illumination assemblies so that said characters appear to be animated.

13. An integrated electroluminescent display device comprising:
    at least one illumination assembly formed by a first set of layers, said illumination assembly including a first electrode, a second electrode, a layer of electroluminescent material disposed between said first and second electrodes, and a plurality of conductive leads connected to corresponding ones of said first and second electrodes, said first electrode being translucent;
    a printed circuit layer having a plurality of conductive segments connected to corresponding ones of said first and second electrodes via said conductive leads; and,
    an electronic component layer including electronic components having electrical contacts connected to corresponding ones of said segments of said printed circuit layer, said electronic components providing for selective illumination of said illumination assembly;
    wherein said printed circuit layer is disposed in a substantially parallel and contiguous relationship with said first set of layers; and wherein said first set of layers comprises
a substrate formed of translucent material, and having said first electrode formed on a surface thereof, said first electrode having a surface that is contiguous with said layer of electro luminescent material, and
a first insulating layer formed by an electrically non-reactive material, said first insulating layer for isolating said electroluminescent material from said second electrode.

14. An integrated electroluminescent display device as recited in claim 13 wherein said printed circuit layer further comprises a second insulating layer providing for isolation of said conductive segments from said second electrode, said conductive segments being formed on a first surface, of said second insulating layer.

15. An integrated electroluminescent display device as recited in claim 14 further comprising at least one membrane switch including:
a first contact formed on said surface of said substrate; and
a second contact formed on a second surface of said second insulating layer which is opposite said first surface, at least one of said first and second contacts being connected to a corresponding one of said segments of said printed circuit layer, said first insulating layer including a hole formed there through, said first and second contacts and said hole being aligned so that said switch is activated upon said first contact being brought into contact with said second contact, said electronic components being responsive to said activation of said switch.

16. An integrated electroluminescent display device as recited in claim 14, further comprising a speaker formed on said substrate, said speaker being electrically coupled with said electronic component layer via through holes formed through said first insulating layer and said second insulating layer.

17. An integrated electroluminescent display device comprising:
at least one illumination assembly formed by a first set of layers, said illumination assembly including a first electrode, a second electrode, a layer of electroluminescent material disposed between said first and second electrodes, and a plurality of conductive leads connected to corresponding ones of said first and second electrodes, said first electrode being translucent;
a printed circuit layer having a plurality of conductive segments connected to corresponding ones of said first and second electrodes via said conductive leads; and,
an electronic component layer including electronic components having electrical contacts connected to corresponding ones of said segments of said printed circuit layer, said electronic components providing for selective illumination of said illumination assembly; wherein
said printed circuit layer is disposed in a substantially parallel and contiguous relationship with said first set of layers,
said first set of layers further includes a printed layer bearing a plurality of icons, each of said icons being associated with one of a first set and a second set of icons, said illumination assemblies forming a pattern corresponding to said second set of icons, and
said electronic components provides for selective illumination of said illumination assemblies to create an illusion of movement of at least one of said first set of icons by illuminating said second set of icons in accordance with a predetermined sequence.

* * * * *